United States Patent [19]
Sugiura

[11] 3,943,830
[45] Mar. 16, 1976

[54] ACTUATING FORCE GENERATING DEVICE

[75] Inventor: Susumu Sugiura, Yokohama, Japan

[73] Assignee: Tokico Ltd., Kawasaki, Japan

[22] Filed: Oct. 15, 1973

[21] Appl. No.: 406,612

[30] Foreign Application Priority Data
Oct. 21, 1972 Japan............................ 47-105541
Oct. 23, 1972 Japan............................ 47-105944
Apr. 20, 1973 Japan............................ 48-44877
Apr. 20, 1973 Japan............................ 48-44878

[52] U.S. Cl............................. 92/63; 92/65; 92/133; 92/152
[51] Int. Cl.²............................................. F01B 7/10
[58] Field of Search............ 92/65, 63, 152, 133, 62

[56] References Cited
UNITED STATES PATENTS

| | | | |
|---|---|---|---|
| 1,990,680 | 2/1935 | Oberstadt............................ | 92/65 |
| 2,278,310 | 3/1942 | Gottlieb............................... | 92/133 |
| 2,768,503 | 10/1956 | Snyder..................................... | 92/63 |
| 3,176,870 | 4/1965 | Cruse....................................... | 92/65 |
| 3,195,416 | 7/1965 | Linquist............................... | 92/133 |
| 3,255,676 | 6/1966 | Berg et al. ............................ | 92/63 |
| 3,623,694 | 11/1971 | Goldberg............................... | 92/65 |

*Primary Examiner*—Paul E. Maslousky
*Attorney, Agent, or Firm*—Wenderoth, Lind & Ponack

[57] ABSTRACT

An actuating force generating device has a multi-stage cylinder body consisting of a plurality of cylinders having different diameters and arranged in series; a plurality of pistons slidably fitted in the cylinders, respectively; fluid ports each provided in the cylinders to discharge or introduce fluid from or into the cylinders; a container provided in the rear of the multi-stage cylinder body; a piston rod forming an actuating end projecting from the multi-stage cylinder body, said rod extending through a rod guide and being affixed to the forward piston; and a resilient member adapted to urge the rearmost piston forwardly.

4 Claims, 8 Drawing Figures

ACTUATING FORCE GENERATING DEVICE

This invention relates to an actuating force generating device and, more particularly to a device adapted to generate an actuating force of predetermined different levels.

A control means is known which controls the actuating force at its intended levels by varying the hydraulic pressure in a hydraulic actuator or the like. However, for achieving actuating forces controlled for accurately predetermined levels, it is not recommendable to use a regulating means such as a hydraulic regulating valve, because of the resultant complicated construction.

It is accordingly the principal object of the invention to provide an actuating force generating device which may selectively generate actuating forces of different levels at a desired timing and which is simple in construction, has a high level of reliability and is low in cost.

According to the present invention, there is provided an actuating force generating device comprising: a multi-stage cylinder body consisting of a plurality of cylinders having different diameters and arranged in series; a plurality of pistons slidably fitted in said cylinders, respectively; fluid ports each provided in said cylinders to discharge or introduce said fluid from or into said cylinders; a container provided in the rear of said multi-stage cylinder body; a piston rod forming an actuating end projecting from said multi-stage cylinder body, said piston rod extending through a rod guide and being affixed rigidly to the forward piston; and a resilient means adapted to urge the rearmost piston forwardly.

It should be noted that the aforesaid resilient means may be a compression spring or gas adapted to be compressed in a container.

The multi-stage cylinder body should preferably be such that a plurality of pistons are provided in series and in a concentric relation, with a cylinder of the smallest diameter being positioned forward, one having the second smallest diameter coming next, and thus one having the largest diameter being placed in the rearmost position.

Where compressed gas is used as a resilient means, it is preferable to provide a pressure regulating means which is adapted to regulate the gas pressure and/or to provide a temperature compensating means adapted to compensate for the variation in gas pressure caused due to variation in temperature.

These and other objects and features of the present invention will become apparent from reading the ensuing description in conjunction with the drawings which show embodiments of the invention.

FIGS. 4 through 6 are partial, longitudinal cross-sectional views of a modification of the embodiment of FIG. 3, in which FIG. 4 shows means for compensating for variation in gas pressure caused due to temperature variation, FIG. 5 shows means for adjusting the gas pressure by the use of a step motor, and FIG. 6 shows means for regulating gas pressure manually;

Figure 1:
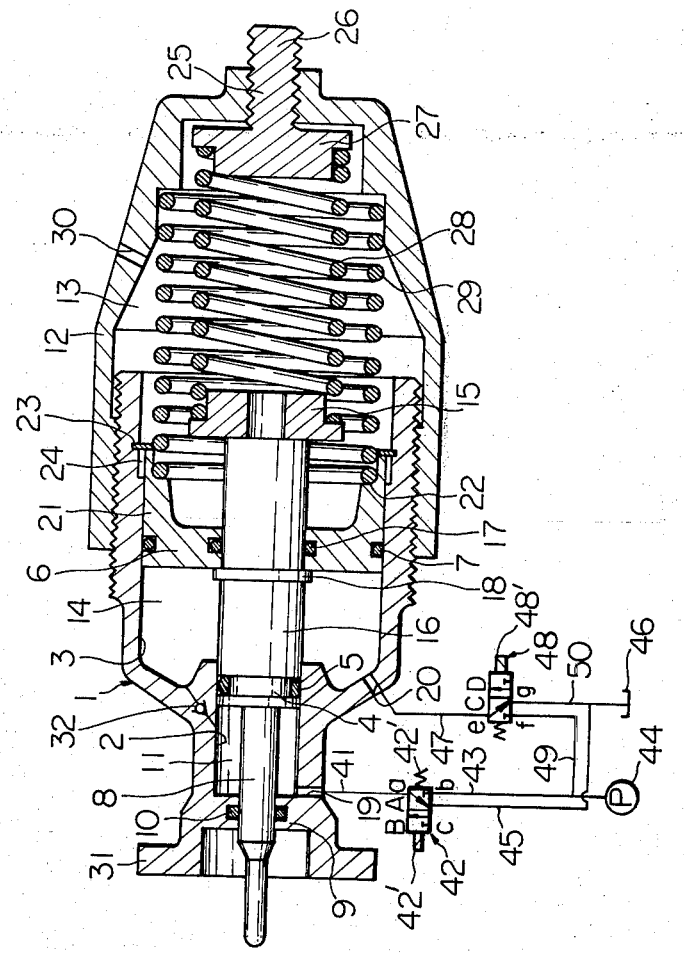
FIG. 1 is a longitudinal cross-sectional view of one embodiment of the invention, coupled with a diagrammatic view of one example of an associated hydraulic system.

Referring now to FIG. 1, shown at 1 is a multi-stage cylinder body consisting of a cylinder 2 of a small diameter and a cylinder 3 of a large diameter integral with said cylinder 2. In this embodiment, the multi-stage cylinder body 1 is in two stages.

Designated at 4 is a small diameter piston fitted sealingly with a seal 5 in the small diameter cylinder 2, said piston 4 being adapted to move through the cylinder 2 axially and slidably.

Shown at 6 is a large diameter piston fitted sealingly with a seal 7 in said large diameter cylinder 3, said piston 6 being adapted to move through the cylinder 3 axially and slidably.

Designated at 8 is a piston rod with an actuating end which externally projects through a seal 10 provided in a rod guide 9 of said multi-stage cylinder body 1, said rod 8 having the other end rigidly affixed to one end face of said small diameter piston 4. Thus, the aforesaid actuating end may urge a piston of a brake cylinder or the like. A chamber 11 is defined by the multi-stage cylinder body and the small diameter piston 4. Shown at 12 is a container threaded on said multi-stage cylinder body 1 and said container 12 is capable of moving axially of said body 1. A chamber 13 is defined by the right hand face of the large diameter piston 6 and the container 12, while a chamber 14 is defined by the left hand face of the large diameter piston 6 and the multi-stage cylinder body 1 plus the right hand face of the small diameter piston 4, as shown.

A spring seat 15 is provided in the chamber 13, and a connecting rod 16 extends from one end of said spring seat 15. The connecting rod 16 extends movably and sealingly through a seal 17 and through the large diameter piston 6 and is affixed integrally with the other face of the small diameter piston 4. It should be recognized that, in this embodiment, the small diameter piston 4 has the same diameter as the connecting rod 16. This is intended to prevent the generation of an undesirable force acting in a rightward or leftward direction due to the pressure in the chamber 14, which pressure acts on the small diameter piston 4 and the connecting rod 16.

Shown at 18 is a stop positioned in said chamber 14 and affixed to said connecting rod 16. Designated by 19 and 20 are fluid ports each formed in said chambers 11 and 14, on the left hand end of the drawing, for discharging or introducing the fluid into and withdrawing fluid from said chambers, respectively. The fluid is supplied into the chambers 11 and 14 through the fluid ports 19 and 20. The stop normally abuts the left hand face of the large diameter piston 6 as shown during the inoperative condition, and the stop 18, coupled with the small diameter piston 4, will move to the left to be separated from the large diameter piston 6 due to the action of the spring (which will be referred to in detail hereinafter), when the fluid within the chamber 11 is discharged from the multi-stage cylinder body 1.

Designated at 21 is an annular sleeve portion fixed to said large diameter piston 6 on the right hand in the drawing. In this respect, the sleeve portion 21 corresponds in its role to the connecting rod 16 of the small diameter piston 4. Furthermore, the sleeve portion 21 has a spring seat 22 in the right hand end thereof as shown. In this embodiment, the sleeve portion 21 is formed integrally with the large diameter piston 6.

Shown at 23 is an annular stop fixed to the inner wall of the large diameter piston 3 whose right hand position is limited by means of an extension 24 abutting on the stopper 23, said extension 24 extending from the sleeve portion 21 further rearwardly of the spring seat 22. The aforesaid extension 24 is integral through the sleeve portion 21 with the large diameter piston 6 and positioned around the outer circumference of the spring seat, while extending to the right from the spring seat 22, as shown.

Designated at 25 is an adjusting screw the one end of which is positioned in the chamber 13 of the container 12 and the other end of which forms an adjusting end 26 threaded in the wall of said container 12 in externally projecting relation therefrom.

The end of the adjusting screw 25 is integral with a spring seat 27 corresponding in its role to the spring seat of the large diameter piston 6.

Shown at 28 is a coil spring provided intermediate the spring seat 15 and the spring seat 27, said coil spring 28 being adapted to urge the small diameter piston 4 via connecting rod 16 to the left, as shown. Designated at 29 is a coil spring provided intermediate the spring seat 22 of the large diameter piston 6 and the inner wall of the container 12, said coil spring 29 being adapted to urge the large diameter piston 6 via sleeve portion 21 to the left, as shown. With this arrangement, assuming that the fluid in the chamber 14 is open to atmosphere, the coil spring 29 urges the small diameter piston 4 via the large diameter piston 6, stop 18 and connecting rod 16. Stated differently, the spring forces of the coil springs 28 and 29 act on the small diameter piston 4.

Meanwhile, the chamber 13 in the container 12 is open to atmosphere through a small diameter hole 30 provided in the wall of the container 12. Shown at 31 is a flange integral with the left hand end of the multistage cylinder body 1 for the purpose of attaching the device to driven means, such as for instance, a brake cylinder (not shown) thereto.

Shown at 32 is check valve provided for the multistage cylinder portion 1 and serving to permit the passage of the fluid from the chamber 11 to the chamber 14 but blocking the passage thereof from the chamber 14 to the chamber 11.

Now, a description will be given of the control system of the apparatus including the aforesaid actuating force generating device.

A pipe 41 has one end connected with the aforesaid port 19 and the other end is connected with a port 'a' of a three-port-two-position electromagnetic valve 42. Connected at one end with a port 'b' of the electromagnetic valve 42 is a pipe 43, the other end of which is connected with a pump 44, while a port 'c' of the electromagnetic valve 42 is open to a tank 46 through the pipe 45. When a solenoid 42' of the electromagnetic valve 42 is unexcited, the electromagnetic valve 42 holds the position 'A' as shown, in which the port 'a' of the electromagnetic valve 42 is in communication with the port 'c', while the port 'b' is maintained in a closed position, whereby the fluid in the chamber 11 is in communication with the tank 46. When the solenoid 42' of the electromagnetic valve 42 is excited, then the port 'b' will communicate with the port 'a', while the port 'c' is maintained closed. At this time, the fluid in the pump 44 is capable of flowing into the chamber 11. When the feeding of electric current to the solenoid 42' of the electromagnetic valve 42 is interrupted, then the position of the electromagnetic valve 42 will be shifted from position B to A instantaneously due to the action of the spring 42''.

A pipe 47 has one end connected with said port 20 and the other end is connected with a port 'e' of a three-port-two-position electromagnetic valve 48. The port 'f' of the electromagnetic valve 48 is connected with a pump 44, while a port 'g' is connected via pipe 50 with the tank 46. When the solenoid 48' of the electromagnetic valve 48 is not excited, then the valve 48 maintains the position C, and the port 'e' will be in communication with the port 'g', while the port 'f' is maintained closed. When the solenoid 48' is excited, then the valve assumes the position D from the position C, whereby the port 'e' will communicate with the port 'f', while the port 'g' is maintained closed. When the feeding of electric current to the solenoid 48' is interrupted, then the electromagnetic valve 48 will assume the position C from position D instantaneously under the action of the spring 48''. The solenoids 42' and 48' are normally maintained in a conductive condition in which the electromagnetic valves 42 and 48 are in the positions opposite those shown in the drawing. As shown in the drawing, the solenoids 42' and 48' are maintained in a conductive condition.

Turning now to the operation of the apparatus of the invention, a description will be given with reference to a brake for use in a vehicle controlled by means of a computer.

A brake cylinder (not shown) is connected with the flange 31. When a slow stop is desired for the vehicle, (The term 'slow stop' as used herein is used in contrast to a 'sudden stop' and means that the final braking pressure is low.), the electric current to the solenoid 42' of the valve 42 will be interrupted. Then, due to the action of the spring 42'' of the electromagnetic valve 42, the position of the valve 42 is shifted from position B to A, whereby the small diameter piston 4, which is being urged under the action of the spring 28, is urged to the left, such that the fluid in the chamber 11 is discharged to the tank 46 in turn through pipe 41, port 'a', port 'c' and pipe 45. The leftward movement of the small diameter piston 4 will cause the piston rod 8 to urge the piston (not shown) of the brake cylinder, thereby braking a vehicle. In this case, only the spring force of the spring 28 acts on the brake cylinder.

For returning the small diameter piston 4 from the left to right, i.e., to its home position, the solenoid 42' of the electromagnetic valve 42 is excited, whereby the pressure fluid will be fed from the pump 44 to the chamber 11. When the apparatus of the invention is maintained in an inoperative condition, electricity will normally be consumed at the pump 44 or solenoid 42', and such electricity may be fed from electric system of the vehicle.

Since the chamber 11 will be open to the tank 46 when the solenoid 42' is in a non-conductive condition, the failure of the brake to act can be avoided, said failure being caused by the failure of the fluid in the chamber 11 to be discharged due to trouble in the electric system.

When a sudden stop is desired for the vehicle, the feeding of the electricity to the solenoids 42' and 48' of electromagnetic valves 42 and 48 is interrupted. Then, the fluid in the chambers 11 and 14 will be discharged to the tank 46 through pipes 41, 45, 47 and 50, whereupon the small and large diameter pistons will move to the left, thereby urging the piston of said brake cylinder. At this time, in case the discharging speed of the fluid from the chamber 11 is greater than that of the fluid from the chamber 14, then the brake in the vehicle will be actuated (The actuating force in this case corresponds to the spring force of the spring 28 in the small diameter piston 4.) and then the piston of the brake cylinder will be urged under the actions of said spring 28 plus spring 29, from the time when the large diameter piston 6 abuts the stop 18 on the small diameter piston 4, with the result that a very great braking force is obtained. Conversely, in case the discharging speed of the fluid from the chamber 14 is greater than that of the fluid from the chamber 11, then the large diameter piston 6 will move, while urging the small diameter piston 4 with the stop 18 and, as a result, the spring force of the springs 28 and 29 will act on the piston of the brake cylinder, as in the previous case. On the other hand, when it is desired to restore the small and large diameter pistons 4 and 6 to the initial positions, as in the case use only of the small diameter piston 4, the solenoids 42' and 48' of the electromagnetic valves 42 and 48 will be excited to thereby supply pressure fluid from the pump 44 to the chambers 11 and 14. The rightward movements of the small and large diameter pistons 4 and 6 are limited by the provisions of stop 23 for the large diameter piston 6 and the stop 18 for the small diameter piston 4.

As can be seen from the drawing of the present embodiment, the outer diameters of small diameter piston 4 and connecting rod 16, and the inner diameter of seal 17 of the large diameter piston 6 are identical. However, as long as the outer diameter of the small diameter piston 4 and the inner diameter of seal 17 of the large diameter piston 6 are identical, the diameter of the connecting rod 16 may be reduced without causing an extra force which might, in either right hand or left hand direction, be created on the small diameter piston 4 due to the fluid pressure in the chamber 14.

Part of the device is a regulating mechanism for the springs 28 and 29, i.e., a regulating mechanism to regulate the force urging the pistons of the brake cylinder. When the container 12 is rotated relative to the multi-stage cylinder body 1, the container 12 will move either to the right or to the left, since the container is threaded on the multi-cylinder body 1, such that the spring force of the springs 28 and 29 can be varied simultaneously therewith. On the other hand, when the adjusting screw 25 is further threaded into wall of the container 12, then only the spring force of the spring 28 will be varied. On the other hand, if the adjusting screw 25 is set so as not to move, before the container 12 is moved, then only the spring force of the spring 29 will be varied. In this respect, however, if the pitch of the adjusting screw 25 is the same as the pitch of the threaded portion of the multi-stage cylinder body 1, then the spring force of the spring 28 will be maintained constant, even if the spring force of the spring 29 is varied by rotating the container 12.

A description will now be given of the operation of the check valve 32. Assume that, upon a sudden stop of a vehicle, the chamber 11 happens to fail to be opened to the tank 46 due to trouble in the electromagnetic valve 42. Then, the large diameter piston 6 will urge the small diameter piston 4 through the stop 18, whereby the fluid in the chamber 11 will be brought under pressure, and then the pressurized fluid flows into the chamber 14 through the check valve 32 to flow into the tank 46. This causes the piston rod 8 to urge the piston of the brake cylinder to actuate a brake on the vehicle.

Meanwhile, if the regulating mechanism for the spring 28 is absent, the other end of the spring 28 is designed to bear against the inner wall of the container 12. Meanwhile, it should be noted that it is simple and easy to make the device of the present invention a three-stage cylinder body.

Figure 2:
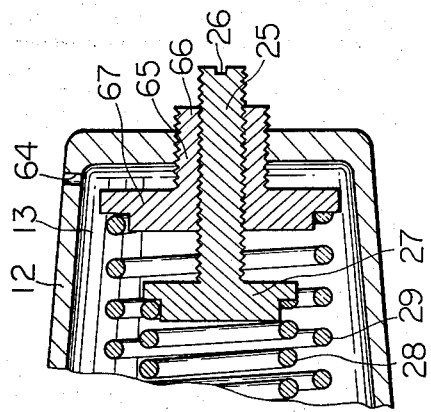
FIG. 2 is a partial cross-sectional view of one modification of the embodiment of FIG. 1, which enables adjustment of a spring force.

FIG. 2 illustrates a modification which itself permits the adjustment of the spring force for the springs 28 and 29, itself. With this arrangement, a spring seat for the outer spring 29 is in a threaded engagement with the wall of container 12 while the spring seat 27 for the inner spring is in a threaded engagement with the spring seat 67, the respective adjusting ends of said spring seats 67 and 27 projecting from the wall of the container 12 in either direction. In passing, it is possible to maintain the compression rate of the spring 28 can constant despite the rotation of the adjusting screw 65, by making the pitch of the adjusting screw 65 the same as that of the adjusting screw 25.

Figure 3:
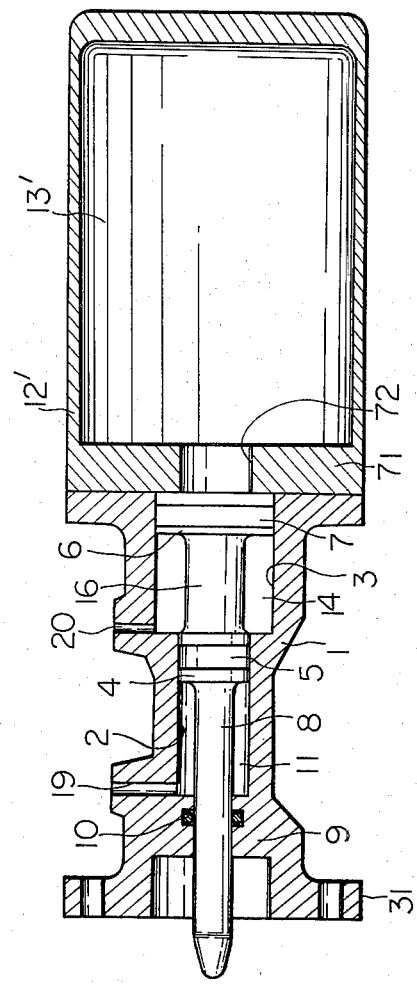
FIG. 3 is a longitudinal cross-sectional view of the essential part of the modification of the embodiment, utilizing gas pressure as a resilient means in place of a spring.

FIG. 3 illustrates the principle of a modification which uses gas pressure in place of springs 28 and 29. A container 12' defines a closed chamber 13', with which is enclosed the gas under pressure of, for instance, about 20 to 40 kg/cm$^2$. The gas as used herein may be air or nitrogen gas.

The embodiment shown differs from that shown in FIG. 1, in that gas pressure will not be exerted on both pistons by the mere use thereof. However, the construction and operation of the other portions except for the above-mentioned are similar to each other, and hence a description will be omitted for such portions. The parts shown in FIG. 3 similar to those in FIG. 1 are given the same reference numerals.

Figure 4:
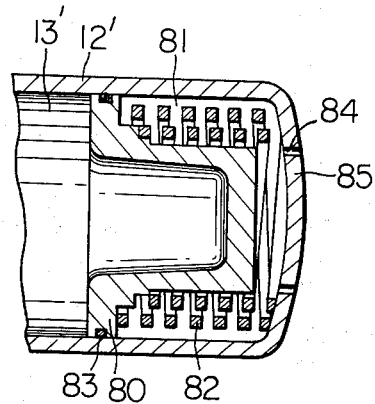

FIG. 4 shows a temperature compensating means which is adapted to avoid influence on the pressure in the gas chamber 13' due to variation in temperature.

A gas pressure regulating piston 80 is slidably provided in a gas chamber 13', and a chamber 81 open to atmosphere is provided in the rear of the piston 80. A compression spring 82 located in the chamber 82 acts on the piston 80. An increase in the pressure in the gas chamber results in the compression in the spring 82, whereby the piston 80 will be moved (to right of the drawing) to compensate for the pressure variation.

The minimization of variation in the gas pressure provides minimization of variation in the braking force and thus the device is advantageous for use in a brake system for a vehicle.

In passing, shown at 83 is a seal, at 84 an air passage and at 85 a closed end of the container 12'.

Figure 5:
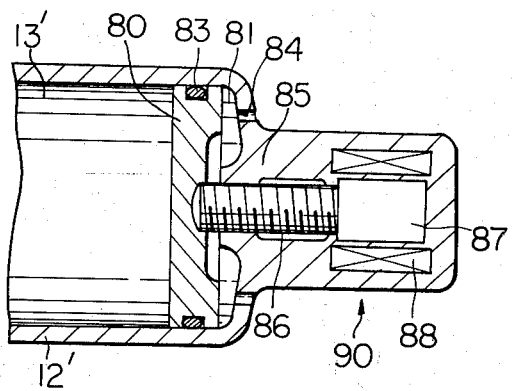
Figure 6:
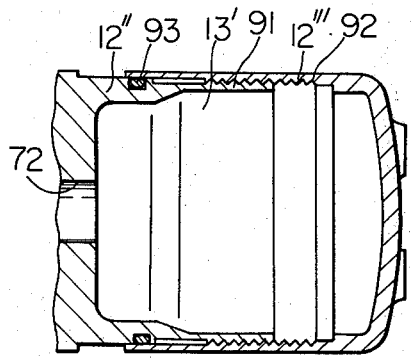

FIGS. 5 and 6 show one example of a regulating device for use in regulating the gas pressure.

As shown in FIG. 5, a step motor 90 is provided in the end portion 85 of the container 12'. The induction elements 88 of the step motor 90 are provided integrally with the end portion 85, with a rotor 87 being integral with an adjusting screw 86.

When an electric signal is fed to the step motor 90, the gas pressure regulating piston 80 will slide either to the left or to the right as shown, due to the adjustment of the adjusting screw 86, thereby adjusting for a variation in the gas pressure.

FIG. 6 shows another embodiment adapted to regulate the pressure in the gas chamber 13'. The container 12' consists of two parts 12" and 12'" provided in a mutually engaging relation. The part 12" has a threaded portion 91 on its outer circumferential surface, while the part 12'" has a threaded portion 92 on its inner peripheral surface. The engagement of the threaded portion 91 with the threaded portion 92 defines chamber 13', in which a high pressure gas is enclosed. In this case, the part 12'" serves as cover for the part 12". Shown at 93 is a seal provided between the parts 12" and 12'".

Figure 7:
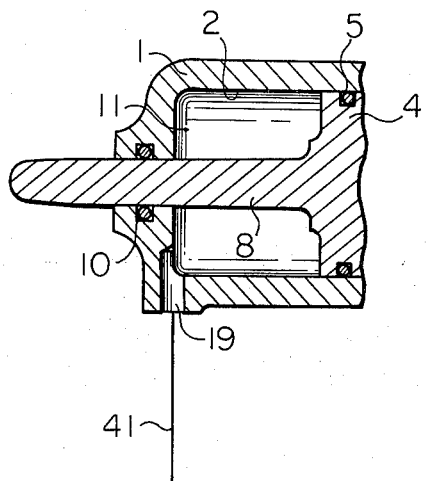
FIG. 7 shows one example of a hydraulic pressure control system adapted to regulate the control hydraulic pressure automatically in a multi-staged fashion.
Figure 8:
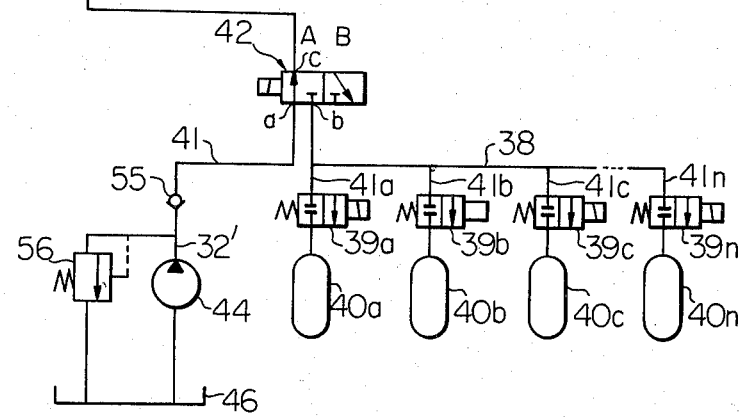
FIG. 8 shows one modification of the embodiment of FIG. 7.
Figure 8:
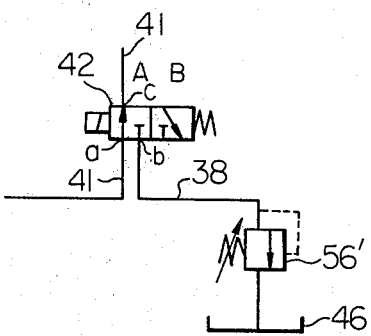

FIGS. 7 and 8 show other embodiments of a control circuit of the apparatus of the invention.

In FIG. 7, a pipe 41 has one end connected with a fluid port 19 and the other end is open to a tank 46. Provided in the pipe 41 are a three-port-two-position electromagnetic valve 42, a check valve 55 and a pump 44.

Connected between the check valve 55 and the pump 44 is a relief valve 56 which is open to the tank. Connected with the three-port-two-position electromagnetic valve 42 is a pipe 38, with which are connected a plurality of pipes 41 a, 416 . . . 41n in parallel with each other, said pipes connecting a two-port-two-position electromagnetic valve 39 and an accumulator 40 arranged in series. Gases having different pressures are enclosed in the accumulators 40a, 40b, . . . 40n, respectively.

When the electromagnetic valve 42 is in the 'A' position as shown, the port 'a' communicates with the port 'c', while the port 'b' is maintained in a closed position. Thus, the fluid from the pump 44 will be introduced via check valve 55 and pipe 41 to the fluid port 19 and then in the chamber 11, thus urging the piston 4. When the piston 4 assumes the position as shown, then the piston will stop, whereby the pressure in the chamber 11 as well as in the pipe 41 will be raised. Then, the relief valve 56 will be actuated to change the pump to an unloaded condition. When electric current is fed to the electromagnetic valve 42 to change the position thereof to position B, then the port 'a' will be closed, while the ports 'b' and 'c' will communicate with each other.

When the electromagnetic valve 39a is opened, the fluid will flow into the accumulator 40a, whereupon the piston rod 8 will project from the cylinder 1 outwardly. However, since there exists pressure within the accumulator 40, the rod 8 will project with a force of the product of the effective pressure-bearing-area and the balance between the gas pressure in the gas chamber or spring force and the pressure within the accumulator 40a, thereby urging a driven means.

When the piston rod has completed its operation and it is desired to restore it to its initial position, the electromagnetic valve 42 is switched to the position A. Then, the fluid which has been introduced into the accumulator 40a will be discharged through piping (not shown) into the tank. As a result, the electromagnetic valve 39a will be closed after the completion of the discharging of the fluid. When the pump 36 is operated again, then the piston will move to the left, being ready for the subsequent operation.

In this manner, the projecting speed of the piston rod can be varied to predetermined levels by utilizing the pressure differences between the fluid in cylinder and the gas within the accumulators 40a, 40b, . . . 40n. Meanwhile, the accumulators 40a, 40b, . . . 40n can be actuated simultaneously, or the accumulator 40b can be actuated at a certain time interval after the operation of the accumulator 40a.

FIG. 8 shows a further embodiment of the control circuit of the invention. In this case, however, a variable type relief valve is used in place of the aforesaid two-port-two-position electromagnetic valve 39 and accumulator 40.

A pipe 38 is connected with the port 'b' of the four-port-two-position electromagnetic valve 42 and includes a variable type relief valve 56' and has an end open to the tank 46. With this arrangement, the force of a piston rod urging a driven means is determined by the pressure difference between the pre-set pressure of the relief valve and the pressure in the gas chamber. On the other hand, when the urging force is desired to be changed, the pre-set pressure of the adjustable relief valve 56' is varied, and thereby the urging force may be varied to a desired level.

With the circuit of this arrangement, unlike the case where the chamber 11 is open from the fluid port 19 via a simple choke means to a tank, the pressure remains in the pipe 41 and the chamber 11 during the operation of the piston rod, not to mention, after the piston rod has projected, such that the force urging the driven means may be maintained constant. Since the choke means only determines the projecting speed of the piston rod by means of its resistance, the pressure in the chamber 11 and pipe 41, after the piston rod has been displaced to the leftward end within the cylinder 1, will be reduced to atmospheric, and accordingly the eventual acting force will be determined by the pressure in the gas chamber or by the force of a spring.

The following advantages achieved, when gas is used in place of springs:

1. Since the piston rod serving to urge the driven means is displaced due to the expansion of gas, there is less variation in the force acting on the piston rod as compared with a mechanical spring.
2. The use of gas permits the use of a gas pressure regulating mechanism having a simple construction, and thus the pressure variation of gas in the gas chamber can be obtained with ease. In addition, the mechanism thereof is simple, free of troubles and low in cost.
3. The provision of the gas pressure and temperature compensating mechanism makes possible a substantially constant gas pressure despite variation in the ambient temperature.
4. Because of the provision of the push rod having a diameter smaller than that of the large diameter piston, the fluid pressure required for restoring the piston rod to the initial condition, after the piston rod has been displaced, can be less than the gas pressure in the gas chamber.

The actuating force generating device of the present invention may be advantageously used for a brake system for use in a vehicle under computer control as well as for a hydraulic brake system for a general type vehicle, and in addition for a hydraulic device for use in a press machine or the like and an actuating device for use in an automatic control device, etc.

Particularly in the case of the use in a vehicle brake system, the brake means is so designed as to be actuated by means of springs or compressed gas in the event of trouble, such that the safety of the vehicle will be insured. Furthermore, the braking force may be adjusted commensurate to the speed of a vehicle or R.P.M. of the wheels thereof, such that the deceleration of the vehicle can be achieved smoothly, and hence it may be used as an anti-skid device. Still furthermore, if it is used as a heavy duty brake which is adapted to be actuated by detecting a vehicle or obstacle running ahead of a driver, a collision can be prevented successfully. In such a case, one of the electromagnetic valves as shown in FIG. 1 may be connected with a detecting means for the purpose of automatic actuation, while the other valve may be actuated manually or may be a foot-step type control valve.

It will be understood that the above description is merely illustrative of preferred embodiments of the invention. Additional modifications and improvements utilizing the discoveries of the invention can be readily anticipated by those skilled in the art from the present discoveries and such modifications and improvements may fairly be presumed to be within the scope and purview of the invention as defined by the claims that follow.

What is claimed is:

1. An actuating force generating device comprising a two stage cylinder body consisting of small and large diameter cylinders arranged coaxially, small and large diameter pistons respectively slidably positioned in said cylinders, the forward end of each of said cylinders having a fluid port therein, a piston rod affixed to the end of said small diameter piston remote from said large diameter piston and having a forward actuating end projecting outwardly from the small diameter cylinder, a container disposed adjacent to the large diameter cylinder at the end of said cylinder body, remote from said small diameter cylinder, a connecting rod extending slidably through the large diameter piston in sealing relation therewith and connected to said small diameter piston, means on said connecting rod transmitting actuating force from the large diameter piston to the connecting rod, first resilient means disposed in said container coupled only to said large diameter piston, and second resilient means in said container coupled only to the rear end of said connecting rod, a portion of the force being transmitted of said first and second resilient means to said large diameter piston and the remainder of the force to said connecting rod, whereby, when hydraulic liquid which has been introduced into said small diameter cylinder is discharged therefrom said remainder portion of the force of said resilient means may be transmitted to said piston rod for generating an actuating force.

2. An actuating force generating device as claimed in claim 1, in which said first and second resilient means includes two springs one engaging said large diameter piston and the other engaging with the rear end of said connecting rod.

3. An actuating force generating device as claimed in claim 2, in which said container includes two spring seats for said two springs respectively which seats are adjustable from outside of said cylinder body independently.

4. An actuating force generating device as claimed in claim 1, in which said cylinder body has a liquid passage therein which allows liquid flow from the small diameter cylinder to the large diameter cylinder.

* * * * *